(12) United States Patent
Napper et al.

(10) Patent No.: US 10,825,110 B2
(45) Date of Patent: *Nov. 3, 2020

(54) ENTITY PAGE RECOMMENDATION BASED ON POST CONTENT

(71) Applicant: Google Inc., Mountain View, CA (US)

(72) Inventors: Jon Napper, Pymble (AU);
Tsung-Yuan Liu, Sydney (AU); Bruce Leendert Polderman, Sydney (AU);
Grace Chung, Zetland (AU); Edward Kessler, Los Gatos, CA (US)

(73) Assignee: GOOGLE LLC, Mountain View, CA (US)

( * ) Notice: Subject to any disclaimer, the term of this patent is extended or adjusted under 35 U.S.C. 154(b) by 208 days.

This patent is subject to a terminal disclaimer.

(21) Appl. No.: 15/668,574

(22) Filed: Aug. 3, 2017

(65) Prior Publication Data

US 2017/0337638 A1    Nov. 23, 2017

Related U.S. Application Data

(63) Continuation of application No. 14/194,966, filed on Mar. 3, 2014, now Pat. No. 9,727,926.

(51) Int. Cl.
*G06Q 50/00* (2012.01)
*G06F 16/9535* (2019.01)
(Continued)

(52) U.S. Cl.
CPC .......... *G06Q 50/01* (2013.01); *G06F 16/35* (2019.01); *G06F 16/9535* (2019.01); *H04L 51/32* (2013.01)

(58) Field of Classification Search
CPC ..... G06Q 50/01; G06F 16/9535; G06F 16/35; H04L 51/32
See application file for complete search history.

(56) References Cited

U.S. PATENT DOCUMENTS

2007/0083520 A1*  4/2007  Shellen ................ G06F 16/958
2009/0248595 A1   10/2009  Lu
(Continued)

OTHER PUBLICATIONS

Sebastian Agosta, "Facebook Like vs. Subscribe for Business Pages", Jan. 30, 2013, Experiencedmg.com, pp. 1-5 (Year: 2013).*
(Continued)

*Primary Examiner* — Kieu D Vu
*Assistant Examiner* — Roberto Borja
(74) *Attorney, Agent, or Firm* — Lowenstein Sandler LLP

(57) ABSTRACT

Methods, systems, and computer programs are presented for an online community management system. One method includes detecting that a user has interacted with a post on a social network. The social network provides a plurality of entity contents. Further, the method includes determining a topic of the post based on content of the post. The method includes recommending following a related entity content of the plurality of entity contents to the user in response to determining that the topic is associated with the related entity content, the user is not following the related entity content, one or more users of the social network have posted in connection with the related entity content within a threshold amount of time, and the user is not blocked from accessing the related entity content.

18 Claims, 10 Drawing Sheets

(51) Int. Cl.
*G06F 16/35* (2019.01)
*H04L 12/58* (2006.01)

(56) References Cited

U.S. PATENT DOCUMENTS

| | | | |
|---|---|---|---|
| 2012/0005224 A1* | 1/2012 | Ahrens | H04W 4/21 |
| | | | 707/769 |
| 2012/0117058 A1 | 5/2012 | Rubinstein | |
| 2012/0173626 A1 | 7/2012 | Reis | |
| 2013/0073568 A1 | 3/2013 | Federov | |
| 2013/0117301 A1 | 5/2013 | Horling | |
| 2013/0212120 A1 | 8/2013 | Ke | |
| 2013/0254716 A1* | 9/2013 | Mishra | G06F 3/04842 |
| | | | 715/810 |
| 2014/0067967 A1* | 3/2014 | Jackson | G06Q 50/01 |
| | | | 709/206 |
| 2014/0201178 A1 | 7/2014 | Baecke | |
| 2014/0379818 A1* | 12/2014 | Cudak | H04L 51/16 |
| | | | 709/206 |

OTHER PUBLICATIONS

Rick Broida, Two Important Facebook 'Hover' Tricks, PC World, p. 1.

\* cited by examiner

If verified that entity page exists, display entity page and title

ENTITY PAGE RECOMMENDATION BASED ON POST CONTENT

RELATED APPLICATION

This application is a continuation application of U.S. patent application Ser. No. 14/194,966 filed on Mar. 3, 2014, the entire contents of which are incorporated by reference.

BACKGROUND

The present implementations relate to methods for providing recommendations based on content accessed by a user, and more particularly, methods, systems, and computer programs for providing recommendations in the social network for following entities in the social network.

The communication capability provided by social networks has opened new forms of communication in today's society, making it easier for people to communicate with each other, as well as providing new vehicles of communications between people and businesses, or with other community groups. As people's interest in using social networks for communication has grown, so has the interest of businesses in using social networks to communicate with people, enabling a new form of communication for keeping customers informed and promote their products.

People want to get information about friends, and about organizations that they like or that they are affiliated with. Social networks often provide recommendations to users for following entities, but these recommendations usually follow an interaction between the user and the entity, such as after endorsing or reading a post from the entity. However, this approach only works for posts created by the entity, and does not work for posts created by other users of the social network (e.g., friends).

SUMMARY

Methods, devices, systems, and computer programs are presented for providing recommendations to follow entities in a social network. It should be appreciated that the present implementations can be implemented in numerous ways, such as a method, an apparatus, a system, a device, or a computer program on a computer readable medium. Several implementations are described below.

Implementations present a system that detects affinity for an entity by a user and provides a recommendation when that affinity is detected, independently on how the interaction between the user and the entity is originated.

In one embodiment, a method includes an operation for detecting a post on a social network. The post is associated with an article, and the social network has a plurality of entity pages associated with respective entities. Further, the method includes operations for determining the topic of the article based on the content of the article, and for determining whether the topic is associated with a related entity page on the social network. The related entity page is recommended to a user accessing the post when the topic is associated with the related entity page. In some implementations, the operations of the method are executed by a processor.

In some embodiments, the post in the social network is annotated by storing an identifier of the related entity page with the post when the topic is determined to be associated with the related entity page.

In some embodiments the topic is determined by checking possible topics in the article against a knowledge graph holding properties and associated values modeling attributes and relationships of entities, where the checking identifies probabilities for one or more candidate topics for being the topic of the article.

In some embodiments, the determination of whether the topic is associated with the related entity page is performed by identifying one or more candidate entity pages that are related to the topic; and selecting one of the candidate entity pages that is an official entity page associated with the topic. Further, in some embodiments the one or more candidate entity pages are identified by a machine learning system.

In some embodiments, recommended the related entity page further includes detecting that the user has selected to view the post; identifying the related entity page from metadata stored with the post; and determining if the user is already following the related entity page.

In some embodiments, recommending the related entity page further includes an operation where, if the user is not already following the related entity page, determining if the related entity page has been recommended to the user; and recommending the related entity page to the user when the related entity page has not been recommended to the user.

Furthermore, in some embodiments the recommendation of the related entity page to the user is stored in a history of recommendations for the user.

The article is associated with a uniform resource locator (URL) in some embodiments, where the URL is provided by a publisher of the article.

In some embodiments, the method includes recommending a publisher entity page for the publisher of the article, where the social network includes personal pages and entity pages associated with respective entities, where an entity is selected from a group consisting of a business, or a famous person or figure, or a commercial figure, or an artist, or a celebrity, or a government group, or a brand, or a political figure, or a community association, or an organization.

In addition, in some embodiments it is determined if the post is inappropriate for being recommended, where the post is inappropriate if the post is abusive, or spam, or offensive. In other embodiments, the method includes performing statistics on a number of entity pages recommended and the number of users accepting the recommended entity pages. Additionally, a follow operation of the related entity page by the user is enabled when the user accepts the recommendation.

In one embodiment, a system includes a social network module, a knowledge graph module, an annotation module, and a recommendation module. The social network module is operable to detect a post on a social network, the post being associated with an article, and the social network having a plurality of entity pages associated with respective entities. Further, the knowledge graph module is operable to check possible topics in the article against a knowledge graph holding properties and associated values modeling attributes and relationships of entities, where the checking identifies probabilities for one or more candidate topics for being the topic of the article. The annotation module is operable to determine a topic of the article based on a content of the article, and to determine whether the topic is associated with a related entity page on the social network, where the annotation module stores the related entity page, when available, with the post. Further, the recommendation module is operable to recommend the related entity page to a user accessing the post when the topic is associated with the related entity page. In one embodiment, the social network module, the knowledge graph module, the annotation module, and the recommendation server are executed by one or more processors.

In some embodiments, the social network module provides a graphical user interface (GUI) for displaying the post and for following entity pages, and the GUI provides an interface for the recommendation. The interface includes information about the related entity page and a selectable option for following the related entity page. In some embodiments, the GUI presents a hover card when user hovers a mouse pointer over information of the related entity page in the post.

In another implementation, a non-transitory computer-readable storage medium storing a computer program, the computer-readable storage medium including program instructions for detecting a post on a social network. The post is associated with an article, and the social network has a plurality of entity pages associated with respective entities. In addition, the storage medium includes program instructions for determining a topic of the article based on a content of the article, program instructions for determining whether the topic is associated with a related entity page on the social network, and program instructions for recommending the related entity page to a user accessing the post when the topic is associated with the related entity page.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

The following implementations describe methods, devices, systems, and computer programs for providing recommendations to follow entities in a social network. It will be apparent, that the present implementations may be practiced without some or all of these specific details.

Implementations presented herein facilitate that users follow or subscribe to other users and other social objects (e.g., entity pages, communities) and ensure that users have interesting and engaging content in their stream. Recommendations are suggested to users of the social network to follow a specific user or other social object based on some indication that users have an interest in the user or social object. This allows the social graph in the social network to grow, improving the user experience of the system.

Implementations are described below with reference to providing recommendations for following entity pages, but the same principles may be applied for following people in the social network based on the content of items viewed by the user.

Figure 1:
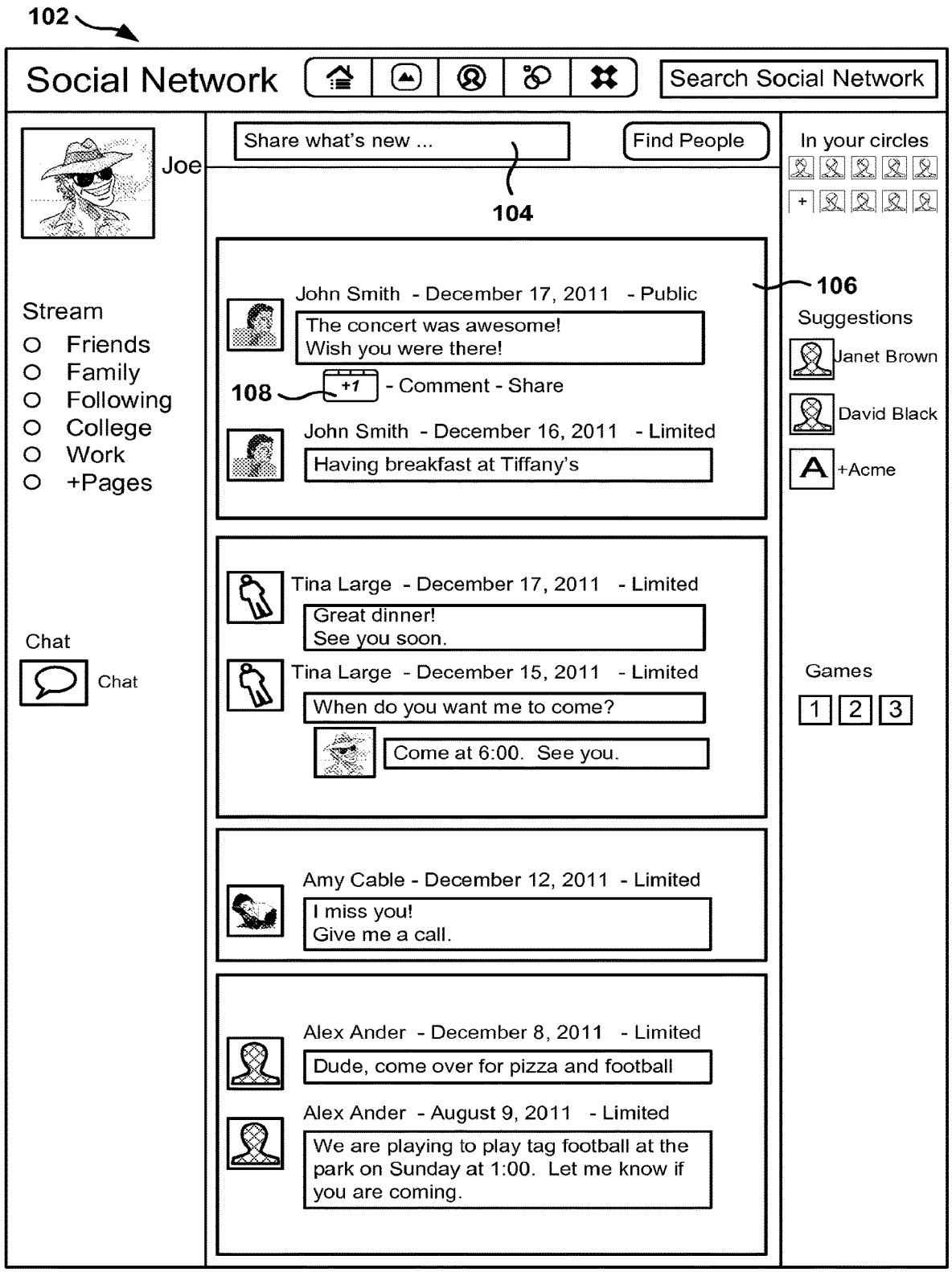
FIG. 1 is a person's web page for interfacing with a social network, according to some implementations.

FIG. 1 is a person's web page for interfacing with a social network, according to some implementations. A user (e.g., Joe) is shown logged into his user account. In some implementations, posts received by a user are referred to as content of a stream in the social network. Page 102 is an example snapshot of a page for viewing a person's stream in the social network.

In some implementations, the stream is presented in a middle panel of page 102. An input box 104 enables the person to add new posts in the social network. When the person enters a new post, the person is able to select the destination for the post. The destination could be to the complete social network (e.g., a public post), to a person, or to one or more groups defined by the person.

In some implementations, the groups defined by the person are referred to as "circles," but other configurations for defining groups are also possible. In some implementations, the post may be a text message, a photo, a video, a link to a webpage, or a location of the person. Thus, the content and form of the post can include any data that can be presented, displayed, listened to, interfaced with, received, sent, shared, approved, or disapproved, etc. Implementations are described with reference to articles, where an article refers to any content that enables the generation of entity annotations. An article could be content (e.g., text, photo, video) entered by a user, a link entered by the user, or content found in the page associated with a link entered by a user. Therefore, an article could be a text message, a photo, a link to a photo, a video, a link to a video, a sound recording, a link to a sound recording, a slide show, a link to a slide show, a link to a webpage, or the content found in a link entered by the user in a post.

In some implementations, the stream includes posts added by the person, by others socially linked to the person, or by an entity that the person has chosen to follow (e.g., be linked with/to in the social network). In some implementations, an entity may be restricted from posting to a person's stream, unless the person has established a social link with the entity beforehand, e.g., the person has chosen to follow the entity.

In some implementations, each post 106 may include information about the author, the timestamp of the post, and the scope of the post (e.g., public, limited, etc.). The post 224 may include a text message entered by person "John Smith," but other types of posts are possible, such as photo, a video, a link, data, etc. The social network provides options 220 to respond to the post, such as providing an endorsement of the post, adding a comment to the post, or sharing the post with others.

As used herein, an endorsement is a public recommendation of an item, such as a webpage, a person, a post, an entity, etc. An endorsement may also be referred to or provided as an acknowledgment, a +1, a thumbs-up, a ✓ (check) mark, a confirmation, a ratification, a validation, a seal of approval, a testimonial, support, advocacy, an approval, a ratification, etc. In some implementations, a button is provided in various web pages to enable the person to provide his or her endorsement. See for example +1 button 108. The various web pages can be pages on accounts of the social network, on pages of third party web sites, on search pages, in lists of search results, etc. The +1 button 108 is provided, in some implementations, as an icon that can be selected by the user.

Therefore, an endorsement button is not limited to use in the social network, and the endorsement button may appear in a variety of places and sites across the Internet. For example, an endorsement button may be next to an Internet search result, an Internet ad, a news article, a product, etc. When the person presses the endorsement button, a count associated with the item endorsed is incremented. The count measures the popularity of the item, and as people endorse an item, the counter associated with the item increases.

In some implementations, a "mention" is an explicit reference to a user in a communication. A mention allows the creator of the post to grab someone's attention to a post because of the introduction of a mention identifier with, for example, someone's name. In some implementations, a mention is performed by utilizing the '+' or '@' signs followed by the name of a person or entity. It is noted that a "+" sign may be used to mention a person or an entity. When a person or an entity is mentioned within the context of the social network, the person or entity may receive a notification that they have been mentioned in a post (depending on notification settings). The user is also able to see the entirety of the post on which the user is mentioned, even if the post wasn't originally shared with the user.

Figure 2:
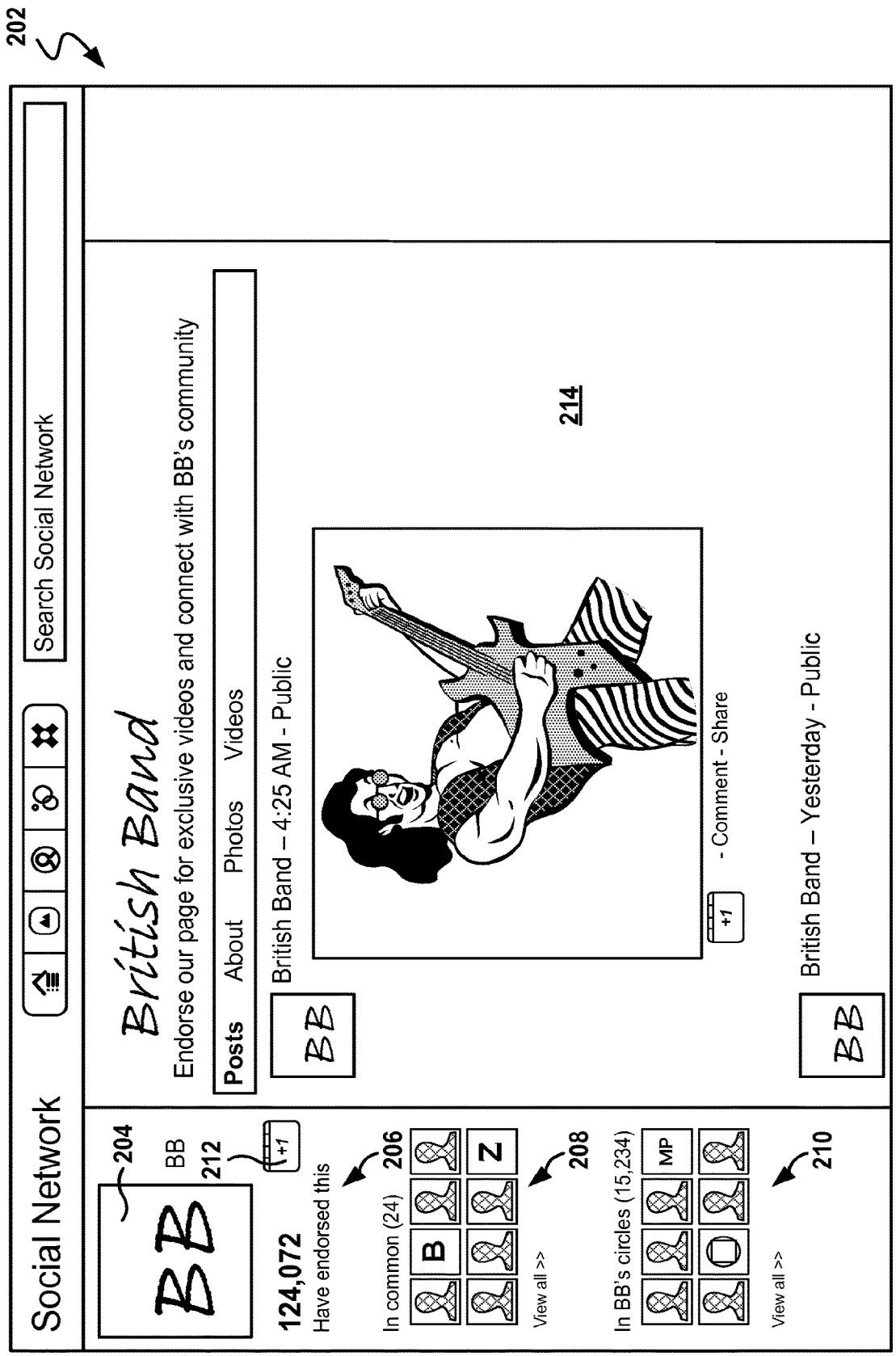
FIG. 2 shows a profile page of an entity in the social network, according to some implementations.

FIG. 2 shows a profile page of an entity in the social network, according to some implementations. The profile page is also referred to herein as entity page. When a user clicks on the name of another user or entity, the associated profile page for the user or the entity is presented. FIG. 2 shows the profile page of an entity. In the middle panel, posts from the entity that are visible to this user are presented, with a similar format to the posts shown in the stream of FIG. 1.

Entity page 202 includes a region that can accept an icon 204 associated with the entity and the name of the entity next to the icon. In addition, an endorsement button 212 gives the person or other entity an option for endorsing the entity associated with the entity page. Counter 206 provides information about the number of people or entities that have endorsed this entity.

Profile page 202 also includes information about users 208 in the user's circles that are also following this entity, e.g., users "in common" following this entity. This information helps the entity improve its corporate image by showing related users that also are associated with the entity. In addition, information 210 is provided about users or entities of the social network that are in the entity's circles but that are not currently in any of the user's circles.

The entity pages allow businesses, groups, and organizations promote themselves and interact with followers. Entity pages are similar to user pages, with a number of exceptions, including: entity pages can relate to entities other than people, entity pages have an official Universal Resource Locator (URL), entity pages can have multiple administrators, and entity pages are public by default.

Implementations presented herein provide recommendations to users for following entities and their respective entity pages, although the same principles may be utilized for following other people in the social network. In some implementations, the entity pages that can be recommended must adhere to the following criteria:

1. The name or the website has been verified. The verification includes validating that the entity page has ownership of the website.

2. The entity page has a public follower count with at least 100 followers.

3. The entity has posted in the entity page within the last 7 days.

4. The entity page is not age restricted, not blocked, and not identified as spam or abuse.

Some implementations presented herein are described with reference to a fictitious entity named "British Band," which is the page for a rock group with the same name.

Figure 3A:
FIG. 3A illustrates a post on a social network that includes a reference to a web article, according to some implementations.

FIG. 3A illustrates a post on a social network that includes a reference to a web article, according to some implementations. FIG. 3A shows a post by a user (named "Amy Cable") that includes text 302 entered by the user and a reference to a web article 304. The web article includes an excerpt 306 from the web article and URL 308 where the user can check the complete article.

Users of the social network want to be related to friends and related to topics of interest to them. For example, people want to be linked (e.g., following) entities that they like, because they like the products or services that they make, because they have some artistic affinity to them, or for any other reason.

A user interaction with content related to an entity is a good indication that the content is of interest to the user, therefore, the entity may also be of interest to the user. In some implementations, the recommendation system analyzes the entity or entities referenced in the content to provide recommendations for the user to be linked with that entity or entities.

However, it is important that the article is really about the entity (which is referred to herein as having high topicality), rather than the entity simply being a passing reference or a minor topic.

The system matches the topical entities with the entities found by the reconciliation system to select one or more users or social objects that can be used as recommendations to the user who interacted with the content. Implementations are presented herein with reference to web articles in a social network context, but the implementations may be used for any type of article (e.g., videos, text, blogs, messaging, email, music, recordings, etc.) and in any type of context (e.g., social network, email, search, blogging, Internet media, webpages, etc.). The implementations illustrated should therefore not be interpreted to be exclusive or limiting, but rather exemplary or illustrative.

Recommending random entities to people is rarely successful, and degrades the user experience when users see recommendations for items that they are not interested in. Implementations presented herein help people find links to entities that are interesting to them.

Figure 3B:
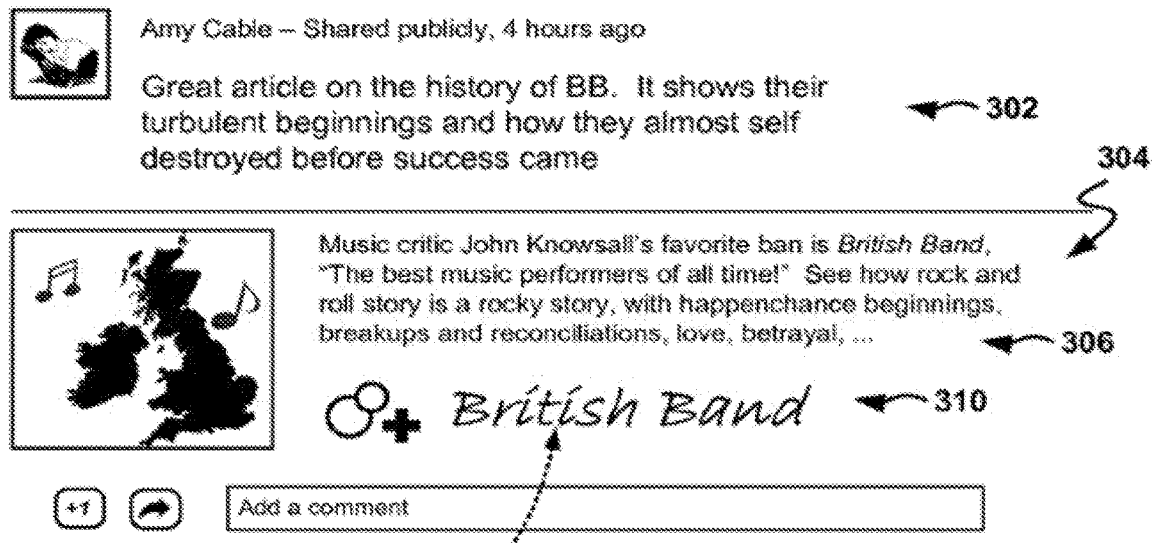
FIG. 3B illustrates the post with identification of the related entity page, according to several implementations.

FIG. 3B illustrates the post with identification of the related entity page, according to several implementations. In some implementations, after the system detects that the article 304 is about an entity, the URL is replaced for an icon associated with entity pages and the title of the entity page 310. If the user clicks on the icon or the title, then the user is presented an interface enabling the user to follow the entity. In other implementations, if the user clicks on the icon or the title then the user starts following the entity immediately.

In some implementations, the recommendation for following the entity is presented after the user has interacted with the content, such as by clicking on the website to read the article. In other implementations, the recommendation is presented without requiring user interaction, as the user simply viewing the content represents an expression of interest by the user, or at least by a friend of the user.

When recommendations are done based on demographic information (e.g., based on age or user geography), then the recommendations have a weak link to the user and the probability of success, for having the user following the entity, are much smaller. However, by providing recommendations related to the content that a user is interested in, the probability of success greatly improves.

Figure 3C:
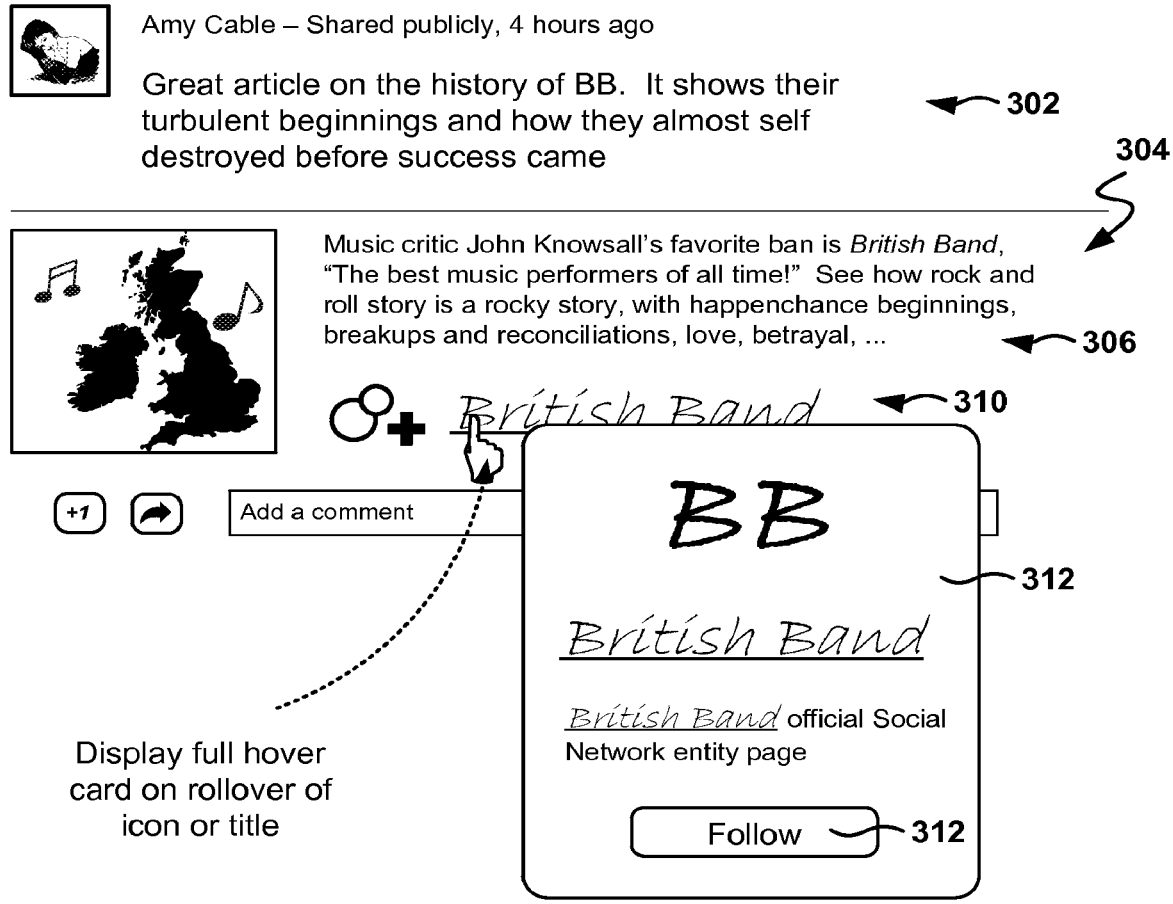
FIG. 3C illustrates a hover car providing additional information about the identify entity page, according to some implementations.

FIG. 3C illustrates a hover car providing additional information about the identify entity page, according to some implementations. In some implementations, the Graphical User Interface (GUI) displays an interface for following the entity when the user hovers the mouse pointer over the title 310 of the entity or the follow-entity icon.

The interface is referred to as hover card 312 and includes information about the entity (e.g., name, title, short description, etc.) and a button 312 to start following the entity. When the user clicks on button 312, then the user is linked in the social network with the entity.

In other implementations, the recommendation may also be provided for the source of the article 304. For example, if a user tends to review articles provided by a media outlet, the entity page of the media outlet may be recommended to the user. Since the user is interested in articles from the media outlet, it is likely that the user will be interested in following articles from the same media outlet.

In some implementations, the recommendation is provided when the user returns to the social network after clicking on an article and visiting the webpage of the article. Since the user was interested in seeing the article, a recommendation for the entity associated with the article is appropriate. For example, if the user clicks on an article about a football team, clicking on the article is a good sign that the user is interested in the football team or in football in general. This would be a good time to make a recommendation to follow the football team, or entities that provide news about football, or the football league, etc.

It is noted that the implementations illustrated in FIGS. 3A-3C are exemplary. Other implementations may utilize different layouts, options to follow, information presented, present more than one recommendation at the same time (e.g., page for the media outlet and page for the entity that is the subject of the article). The implementations illustrated in FIGS. 3A-3C should therefore not be interpreted to be exclusive or limiting, but rather exemplary or illustrative.

Figure 4:
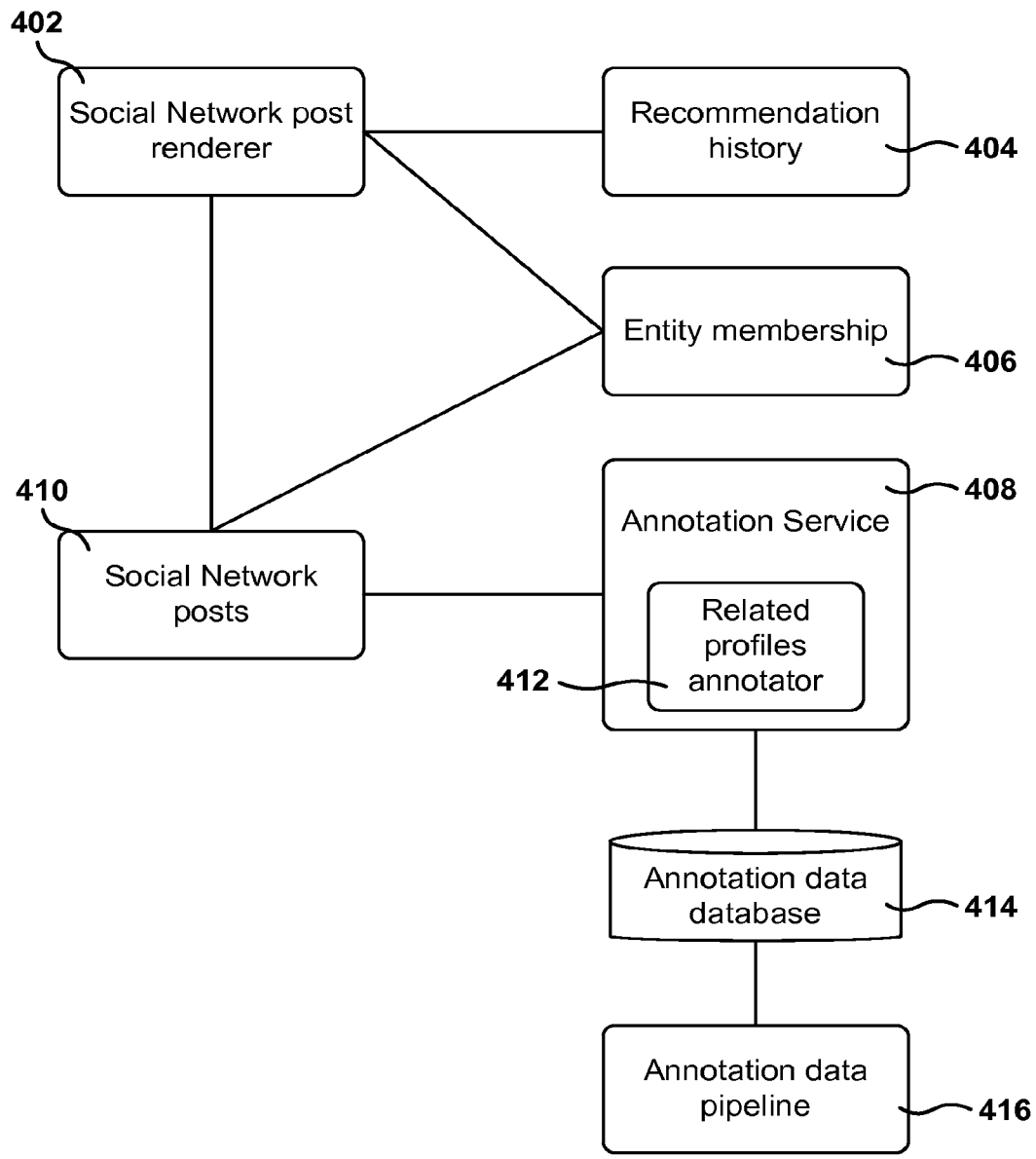
FIG. 4 illustrates an architecture for implementing implementations presented herein.

FIG. 4 illustrates an architecture for implementing implementations presented herein. The social network post renderer 402 uses annotations made on posts to determine if the recommendation to follow an entity page should be included with a post, when the post is rendered in the social network. Further, the social network post renderer 402 displays the interface for selecting the option to follow an entity.

The recommendation history 404 service keeps a history of the recommendations presented to users and the results (e.g., whether the user accepted the recommendation or not) of those recommendations. This way, the system avoids presenting the same recommendation over and over again to a user.

Entity membership module 406 checks that the user is not already following an entity before recommending the entity to the user. Social network posts 410 include all the content that the user can interact with in the social network (e.g., endorse, re-share, comment, etc.).

Annotation service 408 analyzes the content of the post (e.g., the text) of the article, and determines the topic of the article or post (e.g., the article is about the music group British Band). Annotation service 408, is also referred to as "entity tagger." For example, annotation service 408 may determine that the article is about music, or that there is an album name in the article, and that the article is about British Band with a 95% probability. There could be other results, such as the article being about British music with an 80% probability, or being about Great Britain with a 55% probability. Additionally, annotation service 408 identifies the topicality of the article, where topicality is a measure for how important an entity is to the topic of the page.

The annotation service 408 determines if this article is a good candidate for linking the article to an entity page. The related profiles annotator 412 annotates that a given post or article is available for providing recommendations about following a given entity page. In some implementations, the annotation is stored together with the post, so when any user of the social network accesses the post, the annotation is readily available. The technical effect is that computing resource utilization is optimized by determining if there is a linkage between the article and the entity only once, and then making this information available for all users that may check the article. Since there could be thousands of users accessing the article, we do not have to determine the linkage thousands of times.

The advantage of annotating each post is that when users access the post, it is not necessary to determine again if the post is a candidate for a recommendation. For example, an article may be read by thousands of users, but the analysis about the topicality and potential links to entities is performed only once. This ensures that recommendations can be displayed as soon a post is created. It is noted that not all articles will result in a candidate for a recommendation.

The annotation service 408 uniquely identifies specific topics, objects, organizations, people, places, things, concepts, etc., found in the article. There are a number of signals that can be used to determine which entity pages are related to a post, including, but not limited to, the official URL of the entity, entity annotations, and mentions.

The domain of a verified official URL of an entity page is used, in some implementations, to determine that a post has a related entity page. If the post has an attachment or embedded URL that has the same domain as the verified official URL of the entity page, then the post can be considered related to the entity page.

In some implementations, the URLs are canonicalized (e.g., by using a proxy) to handle non-canonical and shortened URLs. In some implementations a blacklist is used to remove domains that should not be included in the mappings. Further, an entity page mentioned in a post is a strong indicator that the post is related to the specified entity page, and thus can be used to make an entity page recommendation.

The annotations regarding the links between articles or posts with entities are kept in annotation database 414. Annotation data pipeline 416 generates data used to annotate the activities with related entity pages. This pipeline selects the appropriate entity pages and associated mappings (e.g., official URL, related entities, etc.) that will be used by annotator 412.

Figure 5:
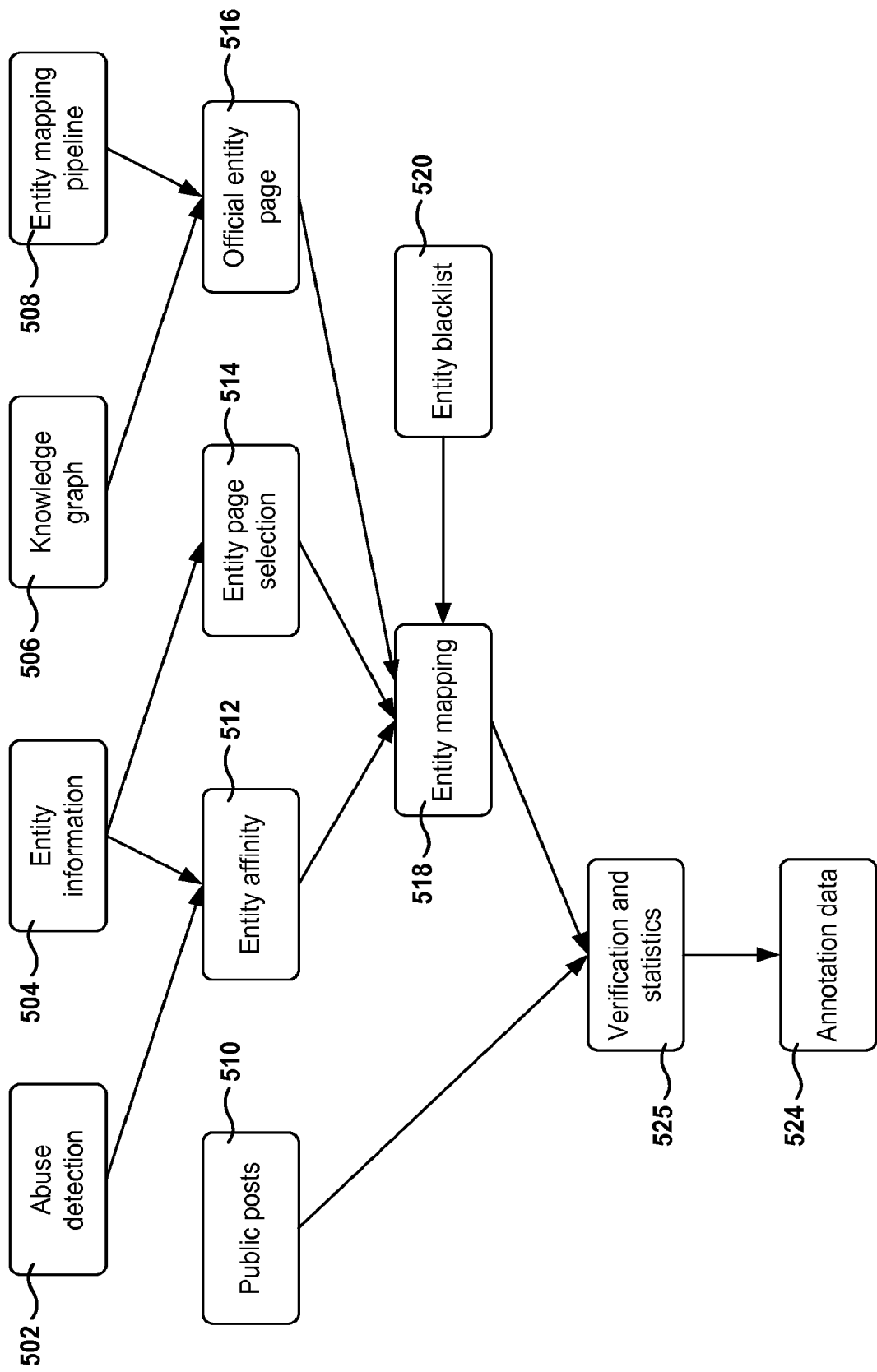
FIG. 5 illustrates operations for a system to recommend entity pages, according to several implementations.

It is noted that the implementations illustrated in FIG. 4 are exemplary. Other implementations may utilize different modules, or combine the functionality of several modules into one, or spread out the functionality over multiple modules or multiple servers, etc. The implementations illustrated in FIG. 4 should therefore not be interpreted to be exclusive or limiting, but rather exemplary or illustrative.

FIG. 5 illustrates operations for a system to recommend entity pages, according to several implementations, also referred to as the annotation data pipeline 416 of FIG. 4. The pipeline performs the following operations to generate and verify the domain-to-entity page mappings:

1. Select entity page recommendation candidates (e.g., website verification status, follow counts, age restrictions, recent post activity, etc.).

2. Extract official URLs for entity pages from the knowledge graph 506 using the mappings generated by the entity to entity page mapping pipeline.

3. Refine the entity page recommendation candidates using data from the entity page affinity pipeline 512.

4. For all entity page recommendation candidates, generate candidate mappings to verified websites and official URLs.

5. The URLs are normalized removing common affixes (e.g., "http://", "www.", "index.html", "home.php", etc.) after which any URLs that contain a path are rejected (e.g., "fox.com/glee").

6. The domain is extracted from the URL and compared to a blacklist for rejecting domains that should not be used to generate follow recommendations.

7. Where duplicate domains exist (usually the result of duplicated entity pages), the entity page with the higher follower count is selected.

8. Generate statistics 525 and verify the quality of the mappings. This process counts the number of related profile annotations generated, and domain outputs annotation counts that can be used to identify top matching or missing URL domains.

The pipeline aims at understanding the text and determining the topic. There could be ambiguity. For example, the article is about a "band", but there different types of bands, or could be related to chemistry, or gangs, etc. The pipeline uses its knowledge to disambiguate what "band" means in this context.

The knowledge graph is a knowledge base to enhance search engine's search results with semantic-search information gathered from a wide variety of sources. The knowledge graph provides structured and detailed information about the topic in addition to a list of links to other sites. The goal is to allow users to use this information to resolve their queries without having to navigate to other sites and assemble the information themselves.

The information in the knowledge base (e.g., Knowledge Graph) can be derived from multiple sources. In some implementations, by the year 2012, the knowledge graph contained over 570 million objects and more than 18 billion facts about and relationships between different objects that are used to understand the meaning of the keywords entered for the search.

For example, the knowledge graph would have an entry for British Band, the people in the band, the songs released by the band, a link to England) their country of origin), the year they started, etc. When the annotation system is reading through the text, the annotation system utilizes the knowledge to decide if the article is about the group British Band or something else. Further, besides identifying the entities, the annotation system also identifies the topicality of the entities, identifying that this article is really about a certain topic.

Entity page selection 514 reconciles the entities that are used as annotations in the content with the entity page. It is noted that if the result is that there are too many possibilities for entities to recommend, the system will not recommend any entity because recommendations are desired to be clear and certain. If the article is not a candidate for a recommendation, then this information is stored with the post so it does not have to be analyzed again.

It is noted that the difficulty in mapping entities to entity pages is related to the fact that there could be billions of entities in knowledge graphs. It is necessary to find out the right entity to match against. Further, there may be many pages associated with an entity (e.g., official page, fan pages, product pages, etc.) but the official entity page must be found.

Entity information 504 contains information about the entity page, such as the name, how many people are following, etc. Entity Mapping Pipeline 508 determines what is the entity page that should be recommended for a particular entity (e.g. for British Band recommend this entity page).

Public posts 510 contains all the public posts in the social network. The annotation system is run through this post an account is made on how many recommendations have been made. In addition, the number of recommendations accepted is also recorded. An entity blacklist 520 is utilized to exclude domains that are unsuitable for making recommendations.

In another implementation (not shown), the following operations are performed:

1. Extract embedded URLs from the post activity data;

2. Look up the URL domain in the domain mapping service to find an associated entity page;

3. Determine if the user already follows the page or if the page recommendation has been blocked by the user; and 4. Display and implement the follow button on the post.

However, this implementation requires analyzing the post each time it is accessed, resulting in more computing resource utilization. Further, it may increase latency of post rendering due to the required analysis each time.

Figure 6:
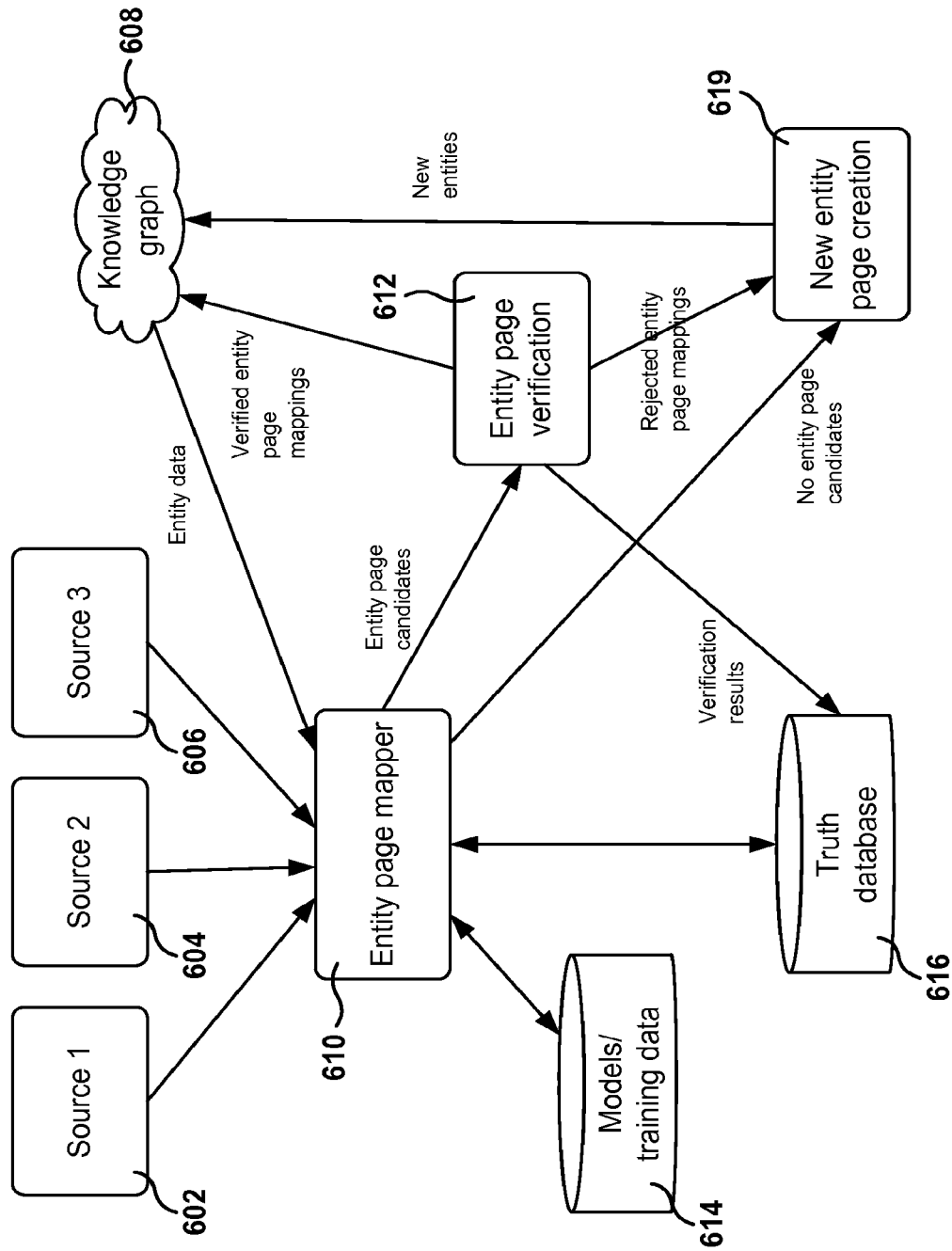
FIG. 6 illustrates an architecture for implementing a knowledge graph, according to some implementations.

FIG. 6 illustrates an architecture for implementing a knowledge graph, according to some implementations. The social network system utilizes the knowledge graph of entities, which is a graph-based representation of structured information about entities. In some implementations, the content annotation system uses natural language processing and machine learning techniques to annotate post content with knowledge graph entities.

The knowledge graph 608 models entities and inter-entity relationships. In some implementations, entities are uniquely identified by a machine identifier (MID) and contain properties and associated values that model the attributes and relationships of the entity.

The entity page mapper 610 may utilize different sources of information (602, 604, and 606) for entity mapping. The sources may include metaweb freebase topic tables for entity data, entity page recommendation pipeline for entity page annotations and entity page metadata, data from associated Wikipedia entries, etc.

All this data must be combined to allow the entity to entity page mapping signals to be extracted for mapping candidates. Entity page verification 612 includes verification that an entity page is that verify official page for a certain entity (e.g., the official entity page for British Band).

In some implementations, entity mappings are only generated for verifying entity pages. The verified entity pages are entity pages that have been verified using either bidirectional linkage of official URL (URL verification), or manual verification with the entity page administrator (site verification).

The followings operations are performed by the entity mapping system:

1. The entity to entity page mapping system takes input from a number of sources (e.g., Wikipedia) and generates a set of candidate entity to entity page mappings.

2. The candidate mappings are verified 612 for accuracy.

3. Mappings that meet the accuracy requirements are triplified and loaded into knowledge graph 608.

4. The results of the mapping verification are fed back into the entity to entity page mapping system as training data, in order to improve the accuracy of the candidate mapping generation over time.

5. In some cases, verification of the candidate mappings may reveal that an appropriate entity does not exist in freebase for a particular entity page. It may be possible to create new freebase entities for these pages.

The data extraction pipeline is used to generate the features required for entity to entity page mapping. In some implementations, the following operations are performed:

1. Extract data required to generate candidate mappings;
2. Generate a set of candidate mappings; and
3. Extract signals for the candidate mappings.

To generate the candidate mappings, candidate entities are identified for an entity page. To identify these candidate entities, in some implementations, annotations generated for the web pages associated with the entity page are utilized. However, the annotations can be very noisy, and incorrect entity annotations are often generated. In addition, there are entity pages that do not contain sufficient data to generate annotations.

Another way of identifying candidate entities for entity pages is by matching the entity page URL against URLs associated with an entity (e.g., freebase official and topical URLs, Wikipedia official URLs). Thus the system uses both entity page annotations and URL annotations to determine candidate entity to entity page mappings.

Figure 7:
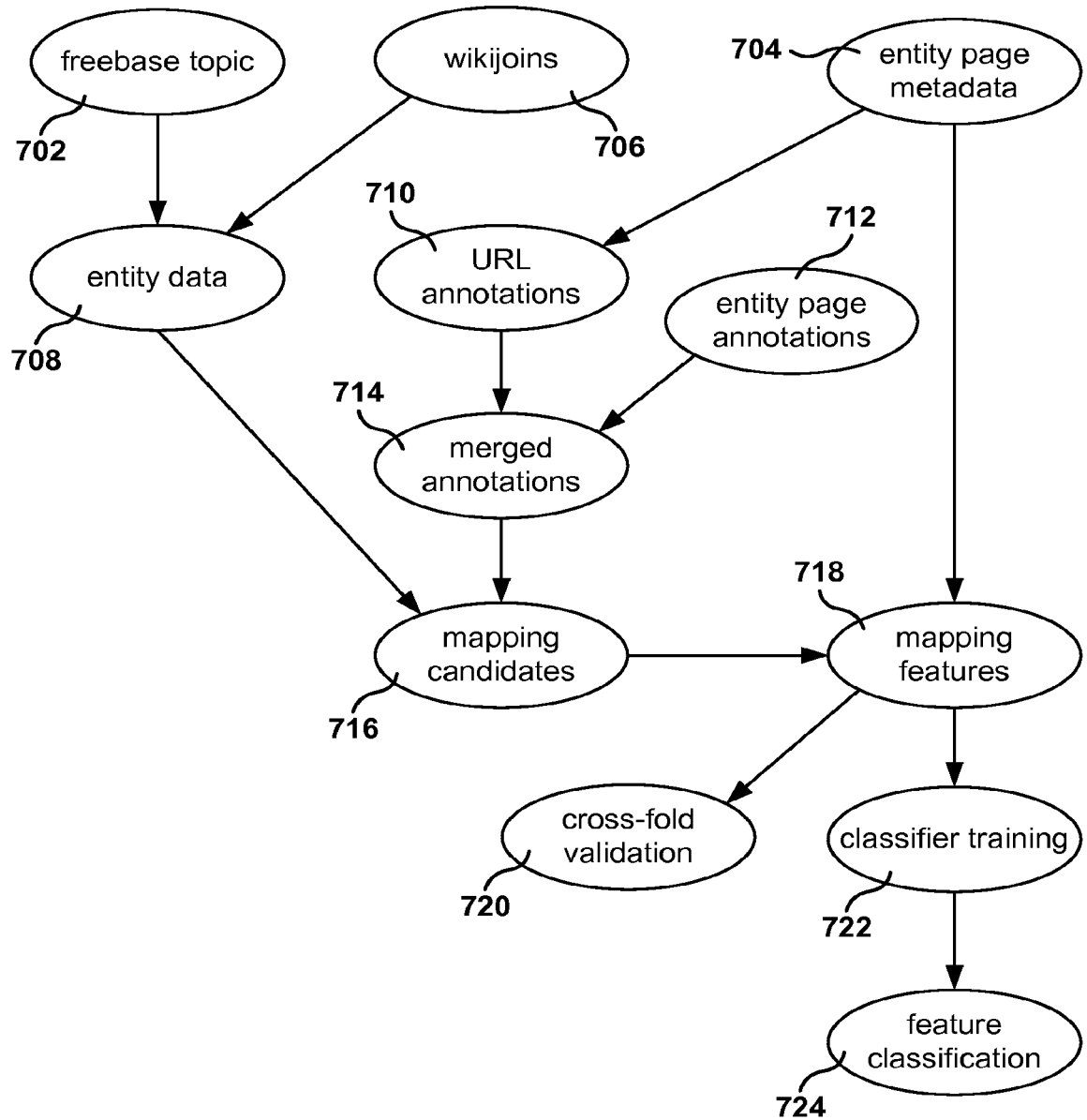
FIG. 7 illustrates the flow of data for mapping entity pages, according to several implementations.

FIG. 7 illustrates the flow of data for mapping entity pages, according to several implementations. In some implementations, the pipeline performs the following operations:

1. Combine freebase and Wikipedia data for an entity using the URL of the associated Wikipedia entry for an entity.

2. Generate a set of URL annotations that indicate that an entity page and an entity share a common URL.

3. Generate candidate entity to entity page mappings.

5. Extracts signals from the candidate mappings to allow the mappings to be scored and classified.

A set of candidate mappings must be generated for verified entity pages that do not already have a mapping. In some implementations, elastic name matching is used to generate a probability estimate that two name strings refer to the same entity. Several factors make this difficult, such as inconsistent punctuation and capitalization, inconsistent use of prefixes and suffixes, and existence of short and long versions of names.

In some implementations, the following operations are used to perform name matching:

1. Reduce the name to canonical form (e.g., convert to lowercase, remove superfluous punctuation, replace "and" with "&", remove common superfluous prefixes and suffixes, etc.)

2. Calculate the edit distance between the two names, normalized by the length of the shorter name.

3. Calculate the substring match between the two names. The substring match is the length of the shorter name divided by the length of the longer name if the shorter name is a substring of the longer, or zero if the shorter name is not a substring of the longer.

A strong indication that an entity maps to (or at least is related to) an entity page is that they both share a common URL. To robust matching of URLs, the URLs need to be reduced to a canonical form before they can be robustly matched.

In addition, the number of times that an entity is mentioned in the web pages associated with an entity page can suggest that the page represents that entity. In particular, entity annotations for the "about" page of an entity page can give a good indication that the entity page is related to that entity.

Sometimes, there is significant ambiguity between a number of similar entities and a particular entity page. These ambiguities are not resolved by annotations or name matching due to the similarity of the entities (e.g., entities for "Christian Dior" include the person, the company, the product line, etc.)

In some implementations, a heuristic classifier is useful for scoring the candidate mappings, since there is insufficient training data to use machine learning techniques, and the resulting classifications can be easily understood and interpreted. The heuristic classifier uses hand-generated rules, and allows a set of high-confidence mappings to be generated.

When using heuristics, for a mapping to be considered valid, the mapping requires:

1. A good match on name and unique URLs;
2. Sufficient entity annotations on the web pages associated with the entity page;
3. Reasonable quality freebase entity;
4. Reasonable quality entity page; and
5. Neither the entity nor the entity page appear in another valid mapping.

While the heuristic classification is effective for detecting high-confidence mappings where strongly-matching signals exist, the heuristic approach has drawbacks in a number of scenarios. An alternative is to use machine learning techniques to generate a system that performs classification based on training data (e.g., a truth set of mappings). The heuristic classifier is useful for generating an initial set of truth data that can be used to train a classifier using machine learning techniques.

There exists a significant amount of correlation between the signals for the entity to entity page mappings. For example:

name matching signals between freebase names and aliases, and Wikipedia entries are likely to be correlated;

matches between different URL types are likely to be correlated;

annotation and name matching scores are likely to be correlated; and entity page quality measurements are likely to be correlated (e.g., number of followers and number of posts)

It is important to de-correlate these signals prior to classification to ensure high classification accuracy. Features can be de-correlated using a method called principal component analysis. To perform this operation, a transform is derived from a set of training vectors that projects the higher-dimensionality correlated features into lower-dimensionality uncorrelated features. The matrix is derived from the most significant (e.g., have the largest eigenvalue absolute value) eigenvectors of the training data covariance matrix, and is applied to all signal vectors prior to training and classification.

Figure 8:
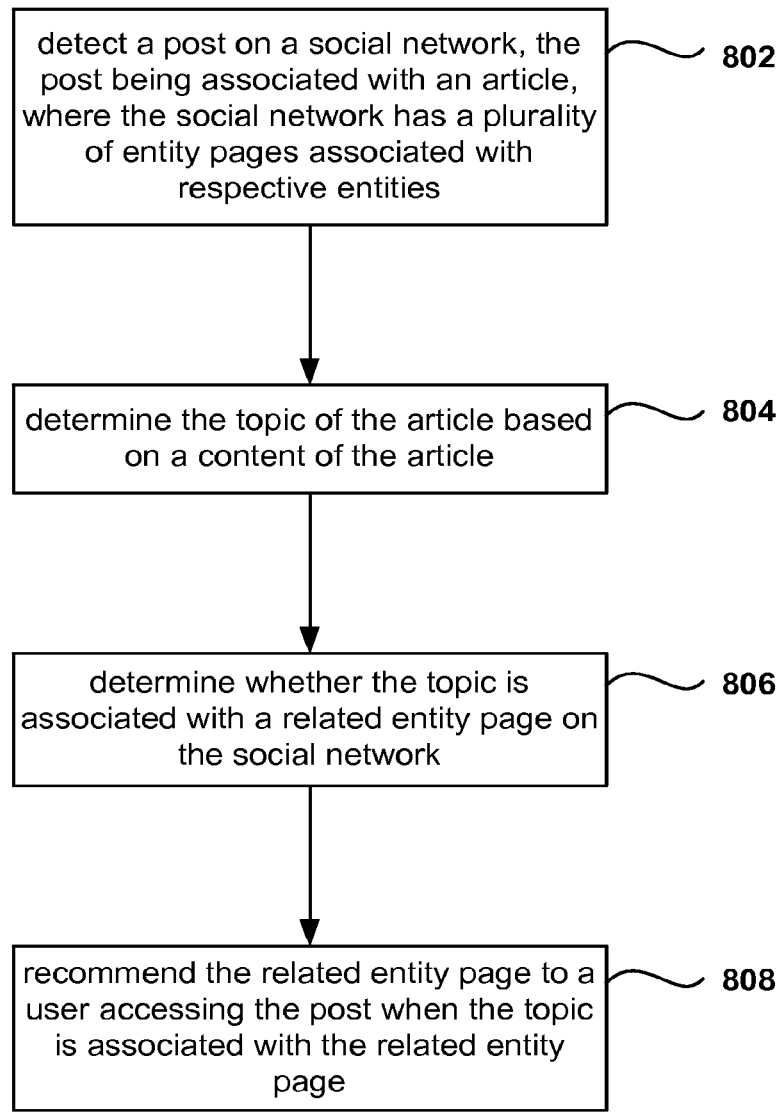
FIG. 8 is a flowchart for providing recommendations to follow entities in a social network, according to several implementations.

FIG. 8 is a flowchart for implementing a reputation management system for an online community, according to several implementations. While the various operations in this flowchart are presented and described sequentially, one of ordinary skill will appreciate that some or all of the operations may be executed in a different order, be combined or omitted, or be executed in parallel.

In operation 802, a post on a social network is detected, the post being associated with an article. The social network has a plurality of entity pages associated with respective entities.

From operation 802, the method flows to operation 804 for determining a topic of the article based on a content of the article. From operation 804, the method flows to operation 806 for determining whether the topic is associated with a related entity page on the social network.

From operation 806, the method flows to operation 808, where the related entity page is recommended to a user accessing the post when the topic is associated with the related entity page. In some implementations, the operations of the method are executed by a processor.

Figure 9A:
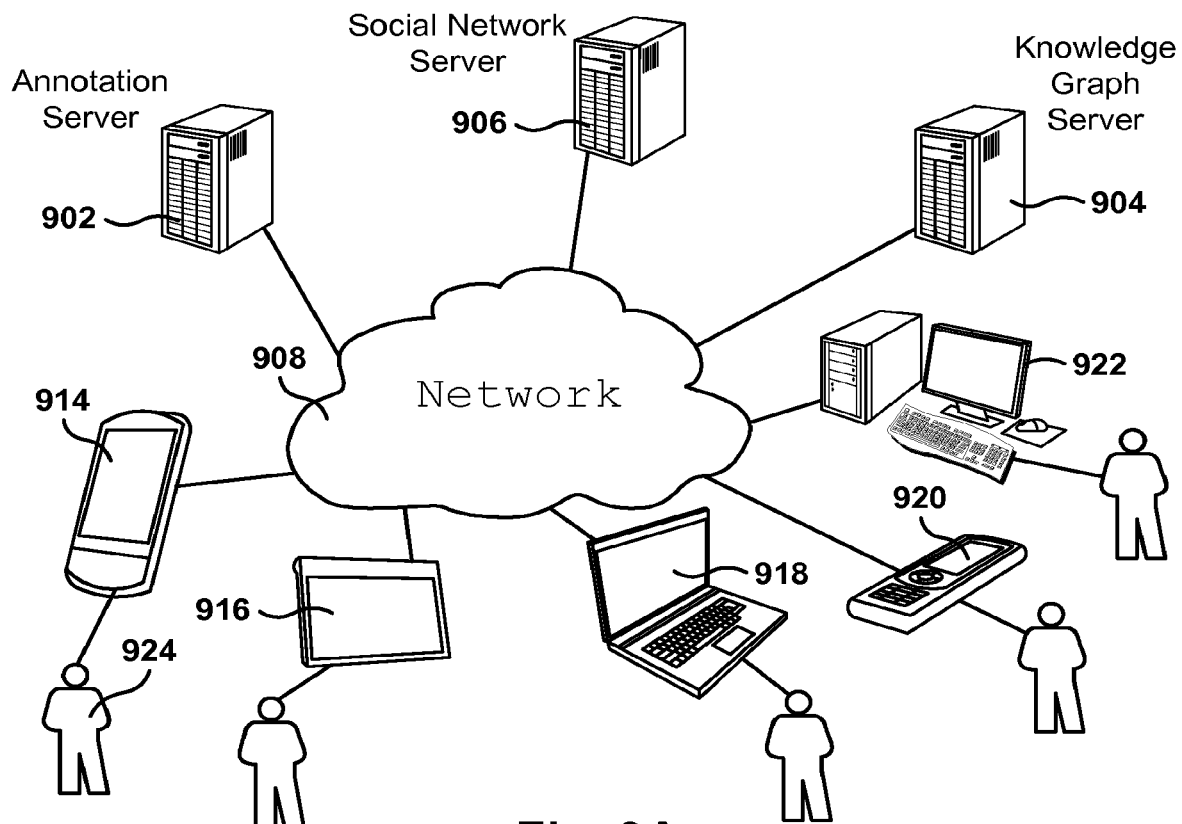
FIG. 9A provides one example architecture of a system that may utilize several implementations described herein.

FIG. 9A provides one example architecture of a system that may utilize several implementations described herein. Users 924 interact with each other in the context of a social network. In addition, each account includes a profile of the user with additional information about the user, e.g., birth date, gender, residence, favorite activities, etc. A user may access the social network through different devices, including a smart phone 914, a tablet computer 916, a laptop 918, a mobile phone 920, a personal computer 922, or any computing device that provides access to the Network 908. Of course, the illustrated devices are only examples.

In several implementations, social network server 906 delivers services that enable users to interface with each other and with entities. The social network provides a site that enables users to define user accounts, which can be people accounts and entity accounts. Through those accounts, users are able to connect with their friends, group of friends, entities, groups of entities, etc. In several implementations, the relationships established in the social network may be utilized in other contexts. Annotation server 902 analyzes posts and web articles to determine if a recommendation may be provided to a user interested in the topic of these posts or web articles. Knowledge graph server 904 implements the knowledge graph functionality previously described.

Other implementations may utilize different servers, have the functionality of one server distributed over a plurality of servers, have the functionality of two or more servers combined into a single server, have a different amount of user categories in the social network, categorize users by different criteria, etc. The implementations illustrated in FIG. 9A should therefore not be interpreted to be exclusive or limiting.

Figure 9B:
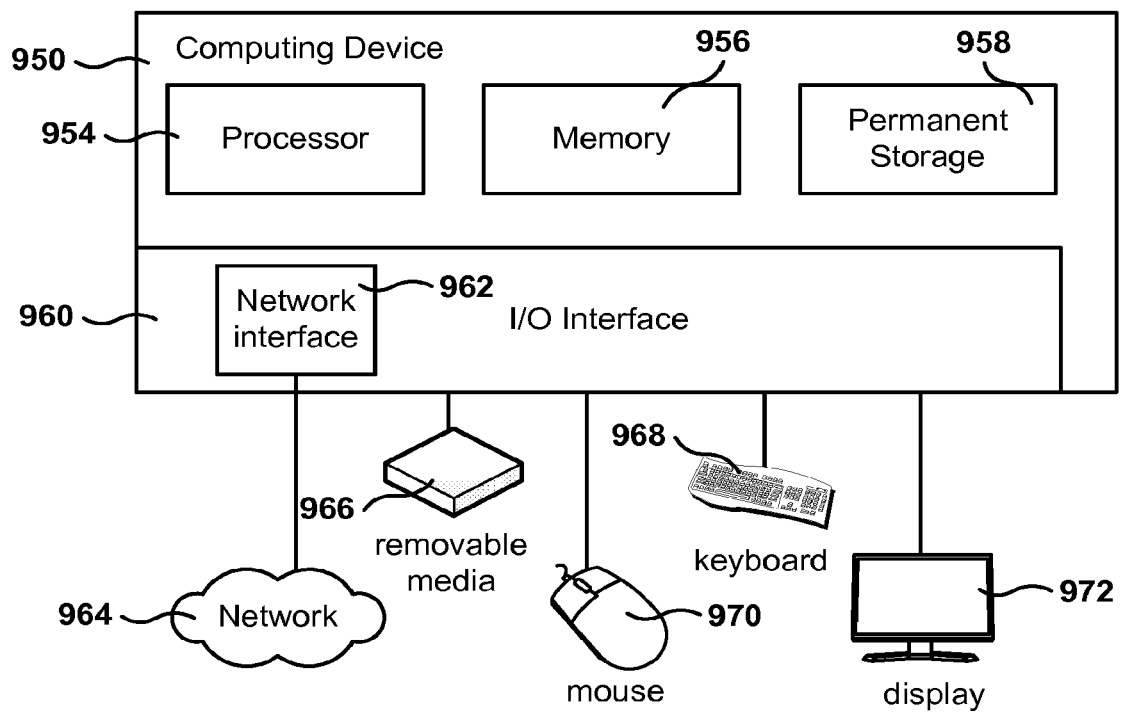
FIG. 9B is a simplified schematic diagram of a computer system for executing implementations described herein.

FIG. 9B is a simplified schematic diagram of a computer system for executing implementations described herein. It should be appreciated that the methods described herein may be performed with a digital processing system (e.g., a conventional, general-purpose computer system). Special purpose computers, which are designed or programmed to perform only one function, may be used in the alternative. The computing device 950 includes a processor 954, which is coupled through a bus to memory 956, permanent storage 958, and Input/Output (I/O) interface 960.

Permanent storage 958 represents a persistent data storage device like a hard drive or a USB drive, which may be local or remote. Network interface 962 provides connections via network 964, allowing messaging (wired or wireless) with other devices. It should be appreciated that processor 954 may be embodied in a general-purpose processor, a special purpose processor, or a specially programmed logic device. Input/Output (I/O) interface 960 provides messaging with different peripherals and is connected with processor 954, memory 956, and permanent storage 958, through the bus. Sample peripherals include display 972, keyboard 968, mouse 970, removable media device 966, etc.

Display 972 is defined to display the user interfaces described herein. Keyboard 968, mouse 970, removable media device 966, and other peripherals are coupled to I/O interface 960 in order to exchange information with processor 954. It should be appreciated that data to and from external devices may be transferred through I/O interface 960. Several implementations can also be practiced in distributed computing environments where tasks are performed by remote processing devices that are linked through a wired or a wireless network.

Implementations can be fabricated as computer readable code on a non-transitory computer readable storage medium. The non-transitory computer readable storage medium holds data which can be read by a computer system. Examples of the non-transitory computer readable storage medium include permanent storage 958, network attached storage (NAS), read-only memory or random-access memory in memory module 956, Compact Discs (CD), Blu-Ray™ discs, flash drives, hard drives, magnetic tapes, and other data storage devices. The non-transitory computer readable storage medium may be distributed over a network-coupled computer system so that the computer readable code is stored and executed in a distributed fashion.

Some, or all operations of the method presented herein are executed through a processor (e.g., processor 954). Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Several implementations presented herein recite a device or apparatus. The apparatus may be specially constructed for the required purpose or may be a general purpose computer. The apparatus includes a processor capable of executing the program instructions of the computer programs presented herein.

Although the foregoing implementations have been described with a certain level of detail for purposes of clarity, it is noted that certain changes and modifications can be practiced within the scope of the appended claims. Accordingly, the provided implementations are to be considered illustrative and not restrictive, not limited by the details presented herein, and may be modified within the scope and equivalents of the appended claims.

What is claimed is:
1. A method comprising:
   detecting, by a processing device, that a first user has interacted with a post on a social network, the social network providing a plurality of entity pages;

determining a topic of the post based on content of the post, wherein the determining of the topic of the post comprises identifying probabilities of one or more candidate topics being the topic of the post;

identifying a first entity based on a measure of relation between the first entity and the topic;

identifying, based on the first entity, a corresponding related entity page of one or more second users associated with the first entity, wherein the plurality of entity pages in the social network comprise the corresponding related entity page; and recommending, to the first user, following the corresponding related entity page of the one or more second users associated with the first entity to receive content associated with the first entity in response to determining that the first user is not following the corresponding related entity page, at least one of the one or more second users associated with the first entity has posted in connection with the corresponding related entity page within a threshold amount of time, and the first user is not blocked from accessing the corresponding related entity page.

2. The method of claim 1, wherein the detecting that the first user has interacted with the post comprises determining that the first user has endorsed, shared, or commented on the post, the post being created by a third user that is different from the one or more second users associated with the first entity.

3. The method of claim 1, wherein the detecting that the first user has interacted with the post comprises determining that the first user has viewed the post.

4. The method of claim 1 further comprising annotating the post with an identifier of the corresponding related entity page.

5. The method of claim 4 further comprising:
detecting that a third user has interacted with the post subsequent to the annotating;
determining that the post is annotated with the identifier of the corresponding related entity page; and
recommending following the corresponding related entity page to the third user in response to determining that the third user is not following the corresponding related entity page, the at least one of the one or more second users associated with the first entity has posted in connection with the corresponding related entity page within the threshold amount of time, and the third user is not blocked from accessing the corresponding related entity page.

6. The method of claim 1, wherein the corresponding related entity page is administered by the one or more second users.

7. The method of claim 1, wherein the social network provides the plurality of entity pages in a stream.

8. A system comprising:
a memory; and
a processing device, coupled to the memory, to:
detect that a first user has interacted with a post on a social network, the social network providing a plurality of entity pages;
determine a topic of the post based on content of the post, wherein to determine the topic of the post, the processing device is to identify probabilities of one or more candidate topics being the topic of the post;
identify a first entity based on a measure of relation between the first entity and the topic;
identify, based on the first entity, a corresponding related entity page of one or more second users associated with the first entity, wherein the plurality of entity pages in the social network comprises the corresponding related entity page; and recommend, to the first user, following the corresponding related entity page of the one or more second users associated with the first entity to receive content associated with the first entity in response to determining that the first user is not following the corresponding related entity page, at least one of the one or more second users associated with the first entity has posted in connection with the corresponding related entity page within a threshold amount of time, and the first user is not blocked from accessing the corresponding related entity page.

9. The system of claim 8, wherein to detect that the first user has interacted with the post, the processing device is to determine that the first user has endorsed, shared, or commented on the post.

10. The system of claim 8, wherein to detect that the first user has interacted with the post, the processing device is to determine that the first user has viewed the post.

11. The system of claim 8, wherein the processing device is further to annotate the post with an identifier of the corresponding related entity page.

12. The system of claim 11, wherein the processing device is further to:
detect that a third user has interacted with the post subsequent to the processing device annotating the post;
determine that the post is annotated with the identifier of the corresponding related entity page; and
recommend following the corresponding related entity page to the third user in response to determining that the third user is not following the corresponding related entity page, the at least one of the one or more second users associated with the first entity has posted in connection with the corresponding related entity page within the threshold amount of time, and the third user is not blocked from accessing the corresponding related entity page.

13. The system of claim 8, wherein the corresponding related entity page is administered by the one or more second users.

14. A non-transitory machine-readable storage medium storing instructions which, when executed, cause a processing device to perform operations comprising:
detecting that a first user has interacted with a post on a social network, the social network providing a plurality of entity pages;
determining a topic of the post based on content of the post, wherein the determining of the topic of the post comprises identifying probabilities of one or more candidate topics being the topic of the post;
identifying a first entity based on a measure of relation between the first entity and the topic;
identifying, based on the first entity, a corresponding related entity page of one or more second users associated with the first entity, wherein the plurality of entity pages in the social network comprise the corresponding related entity page; and
recommending, to the first user, following the corresponding related entity page of the one or more second users associated with the first entity to receive content associated with the first entity in response to determining that the first user is not following the corresponding related entity page, at least one of the one or more second users associated with the first entity has posted in connection with the corresponding related entity page within a threshold amount of time, and the first user is not blocked from accessing the corresponding related entity page.

15. The non-transitory machine-readable storage medium of claim 14, wherein the detecting that the first user has interacted with the post comprises determining that the first user has endorsed, shared, or commented on the post.

16. The non-transitory machine-readable storage medium of claim 14, wherein the detecting that the first user has interacted with the post comprises determining that the first user has viewed the post.

17. The non-transitory machine-readable storage medium of claim 14, wherein the operations further comprise annotating the post with an identifier of the corresponding related entity page.

18. The non-transitory machine-readable storage medium of claim 17, wherein the operations further comprise:
- detecting that a third user has interacted with the post subsequent to the annotating;
- determining that the post is annotated with the identifier of the corresponding related entity page; and
- recommending following the corresponding related entity page to the third user in response to determining that the third user is not following the corresponding related entity page, the at least one of the one or more second users associated with the first entity has posted in connection with the corresponding related entity page within the threshold amount of time, and the third user is not blocked from accessing the corresponding related entity page.

* * * * *